(12) United States Patent
Huang et al.

(10) Patent No.: US 10,801,887 B2
(45) Date of Patent: Oct. 13, 2020

(54) TRANSMISSIVE SAMPLING MODULE AND TRANSMISSIVE SPECTROMETER

(71) Applicant: InnoSpectra Corporation, Hsinchu County (TW)

(72) Inventors: Kuo-Sheng Huang, Hsinchu County (TW); Chia-Ching Tso, Hsinchu County (TW); Tsan-Fu Tseng, Hsinchu County (TW); Hsi-Pin Li, Hsinchu County (TW)

(73) Assignee: InnoSpectra Corporation, Hsinchu (TW)

( * ) Notice: Subject to any disclaimer, the term of this patent is extended or adjusted under 35 U.S.C. 154(b) by 40 days.

(21) Appl. No.: 16/228,789

(22) Filed: Dec. 21, 2018

(65) Prior Publication Data

US 2019/0204149 A1    Jul. 4, 2019

(30) Foreign Application Priority Data

Dec. 28, 2017    (CN) ...................... 2017 2 1875122 U

(51) Int. Cl.
*G01J 3/02*   (2006.01)
*G01J 3/04*   (2006.01)
*G01N 21/03*   (2006.01)

(52) U.S. Cl.
CPC .......... *G01J 3/0202* (2013.01); *G01J 3/0256* (2013.01); *G01J 3/04* (2013.01); *G01N 21/03* (2013.01); *G01J 3/0291* (2013.01); *G01J 2003/045* (2013.01); *G01N 2021/0367* (2013.01)

(58) Field of Classification Search
CPC .......... G01J 3/0202; G01J 3/0256; G01J 3/04; G01J 2003/045; G01J 3/0291; G01N 21/03; G01N 2021/0367
See application file for complete search history.

(56) References Cited

U.S. PATENT DOCUMENTS

| 5,680,209 | A | 10/1997 | Machler | |
| 9,279,761 | B1 * | 3/2016 | Sternick | ................. G01N 21/03 |
| 2009/0219527 | A1 * | 9/2009 | Hulme | ................. G01N 21/03 |
| | | | | 356/319 |

(Continued)

OTHER PUBLICATIONS

Pascal Nelson., "DLP®Technology for Spectroscopy", Texas Instruments Incorporated , DLPA048A, Feb. 2014, Revised Aug. 2016, pp. 1-9.

(Continued)

*Primary Examiner* — Abdullahi Nur
(74) *Attorney, Agent, or Firm* — JCIPRNET

(57) ABSTRACT

A transmissive sampling module is provided, which is adapted to a spectrometer main body. The transmissive sampling module includes a light source assembly and a support base. The light source assembly is directly connected to the support base. The support base includes a tube body and at least one fixing member. The tube body surrounds an accommodating groove, and an extending direction of the tube body is not parallel to an optical path of the light source assembly, and the tube body includes a transparent portion, and the optical path of the light source assembly passes through the transparent portion and the accommodating groove. The at least one fixing member is disposed on the tube body and is adjustably protruded out of an inner surface of the tube body. A transmissive spectrometer is also provided.

15 Claims, 20 Drawing Sheets

(56) References Cited

U.S. PATENT DOCUMENTS

2012/0322052 A1\* 12/2012 Halverson ............... G01N 1/18
435/5

OTHER PUBLICATIONS

Optecks, LLC., "Transmissive DLP NIRscan Nano EVM & Transmissive Nano Module EVM," accessed Oct. 2017, Available at: https://www.optecks.com/Portal/index.php/products-root/spectrometers/spectrometer-with-trasmissive-module & https://www.optecks.com/Portal/index.php/products-root/spectrometers/transmissive-module-evm.
Optecks, LLC., "Transmission Module EVM_Texas Instruments," accessed Oct. 2017, Available at: http://www.ti.com/devnet/docs/catalog/endequipmentproductfolder.tsp?actionPerformed=productFolder&productId=24480.

\* cited by examiner

TRANSMISSIVE SAMPLING MODULE AND TRANSMISSIVE SPECTROMETER

CROSS-REFERENCE TO RELATED APPLICATION

This application claims the priority benefit of China application serial no. 201721875122.0, filed on Dec. 28, 2017. The entirety of the above-mentioned patent application is hereby incorporated by reference herein and made a part of this specification.

BACKGROUND OF THE INVENTION

Field of the Invention

The invention relates to a sampling module and a spectrometer, and particularly relates to a transmissive sampling module and a transmissive spectrometer.

Description of Related Art

Presently, before using a conventional transmissive spectrometer for measurement, a user has to respectively connect a plurality of optical fiber tubes between a light source assembly and a support base and between the support base and a spectrometer main body one-by-one, and only after the above devices are assembled, the measurement may be conducted. Therefore, the conventional transmissive spectrometer is more suitable for operating in an environment without space restriction and a usage state without moving. In case of a small space environment, the conventional transmissive spectrometer is less convenient to be assembled. Moreover, if it is required to measure in a moving state, since the conventional transmissive spectrometer is formed by connecting a plurality of components, it is not convenient to be moved. Moreover, high assembled cost of the components, it is of no avail for promoting consumer applications.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in this "BACKGROUND OF THE INVENTION" section does not mean that one or more problems to be resolved by one or more embodiments of the invention were acknowledged by a person of ordinary skill in the art.

SUMMARY OF THE INVENTION

The invention is directed towards a transmissive sampling module, in which a light source assembly and a support base are modularized, and the transmissive sampling module is adapted to be quickly assembled to a spectrometer main body, the transmissive sampling module has a small volume, and has less separated components, so that it is adapted to smaller space environment and mobile measurement.

The invention is directed to a transmissive spectrometer, which has the aforementioned transmissive sampling module.

Other objects and advantages of the invention can be further illustrated by the technical features broadly embodied and described as follows.

In order to achieve one or a portion of or all of the objects or other objects, an embodiment of the invention provides a transmissive sampling module, which is adapted to a spectrometer main body. The transmissive sampling module includes a light source assembly and a support base. The light source assembly is directly connected to the support base. The support base includes a tube body and at least one fixing member. The tube body surrounds an accommodating groove, and an extending direction of the tube body is not parallel to an optical path of the light source assembly, and the tube body includes a transparent portion, and the optical path of the light source assembly passes through the transparent portion and the accommodating groove. The at least one fixing member is disposed on the tube body and is adjustably protruded out of an inner surface of the tube body.

An embodiment of the invention provides a transmissive spectrometer including a spectrometer main body and a transmissive sampling module. The spectrometer main body includes a light incident surface. The transmissive sampling module is detachably connected to the spectrometer main body, and the transmissive sampling module contacts the light incident surface. The transmissive sampling module includes a light source assembly and a support base. The light source assembly is directly connected to the support base. The support base includes a tube body and at least one fixing member. The tube body surrounds an accommodating groove, and an extending direction of the tube body is not parallel to an optical path of the light source assembly, and the tube body includes a transparent portion, and the optical path of the light source assembly passes through the transparent portion and the accommodating groove. The at least one fixing member is disposed on the tube body and is adjustably protruded out of an inner surface of the tube body.

In an embodiment of the invention, the tube body includes a bottom plate and a plurality of sidewalls extended from the bottom plate, where the bottom plate and the sidewalls commonly surround the accommodating groove, and a normal direction of the bottom plate is perpendicular to the optical path of the light source assembly.

In an embodiment of the invention, at least one first slit is formed on one of the sidewalls and extends along the normal direction of the bottom plate, and the at least one first slit communicates with the accommodating groove.

In an embodiment of the invention, at least two second slits are respectively formed on two opposite sidewalls of the sidewalls, and are located at opposite positions on the two opposite sidewalls, the support base further includes a separation plate inserted in two of the at least two second slits located at the opposite positions on the two opposite sidewalls, so as to separate the accommodating groove into regions of different sizes.

In an embodiment of the invention, the tube body includes a plurality of sidewalls, the sidewalls commonly surround the accommodating groove, the tube body has two openings at two opposite ends, and the extending direction of the tube body is perpendicular to the optical path of the light source assembly.

In an embodiment of the invention, the light source assembly is detachably connected to the support base.

In an embodiment of the invention, the transmissive sampling module further includes an optical device disposed in the support base and located on the optical path of the light source assembly.

An embodiment of the invention provides a transmissive sampling module which is adapted to a spectrometer main body. The transmissive sampling module includes a support base. The support base includes a tube body, where the tube body includes a bottom plate and a plurality of sidewalls extended from the bottom plate. The bottom plate and the sidewalls commonly surround an accommodating groove, where one of the sidewalls includes a transparent portion, and a light is incident to the accommodating groove through the transparent portion, and the bottom plate includes at least one through hole communicating with the accommodating groove.

According to the above description, in the transmissive spectrometer and the transmissive sampling module of the invention, the light source assembly is directly aligned with and assembled to the support base, so that the step of using optical fiber tubes to connect the light source assembly and the support base of the conventional technique is omitted, which is more convenient in operation and has a low cost. Moreover, the tube body of the support base surrounds the accommodating groove used for accommodating a test tube. The fixing member is disposed on the tube body and is adjustably protruded out of the inner surface of the tube body, so as to fix the test tube in the accommodating groove to enhance accuracy in measurement.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
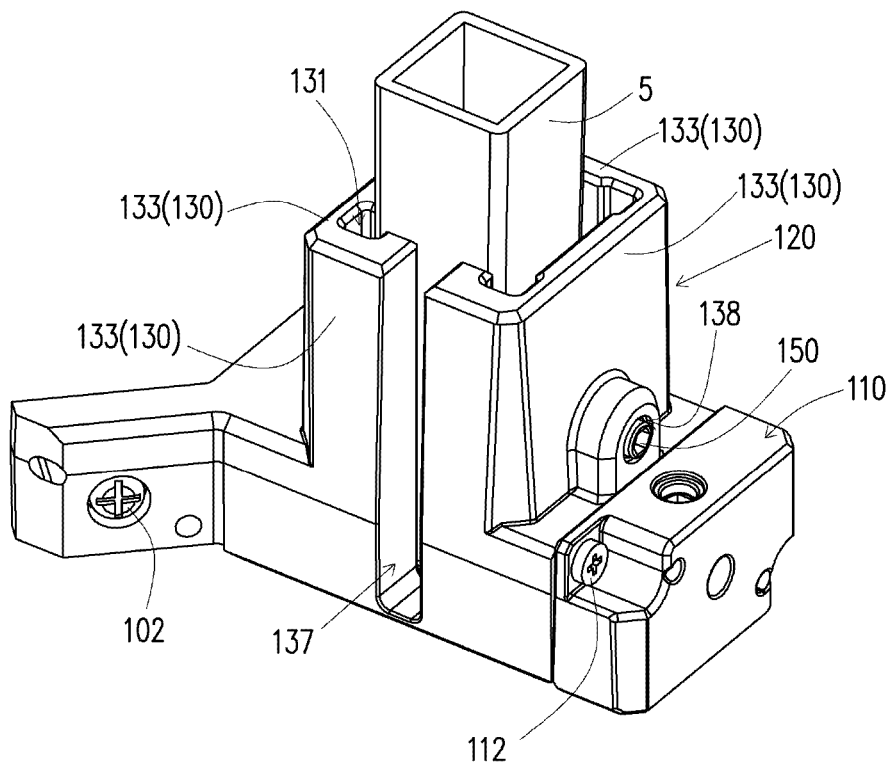
FIG. 1 is a three-dimensional view of a transmissive sampling module and a test tube according to an embodiment of the invention.
Figure 2:
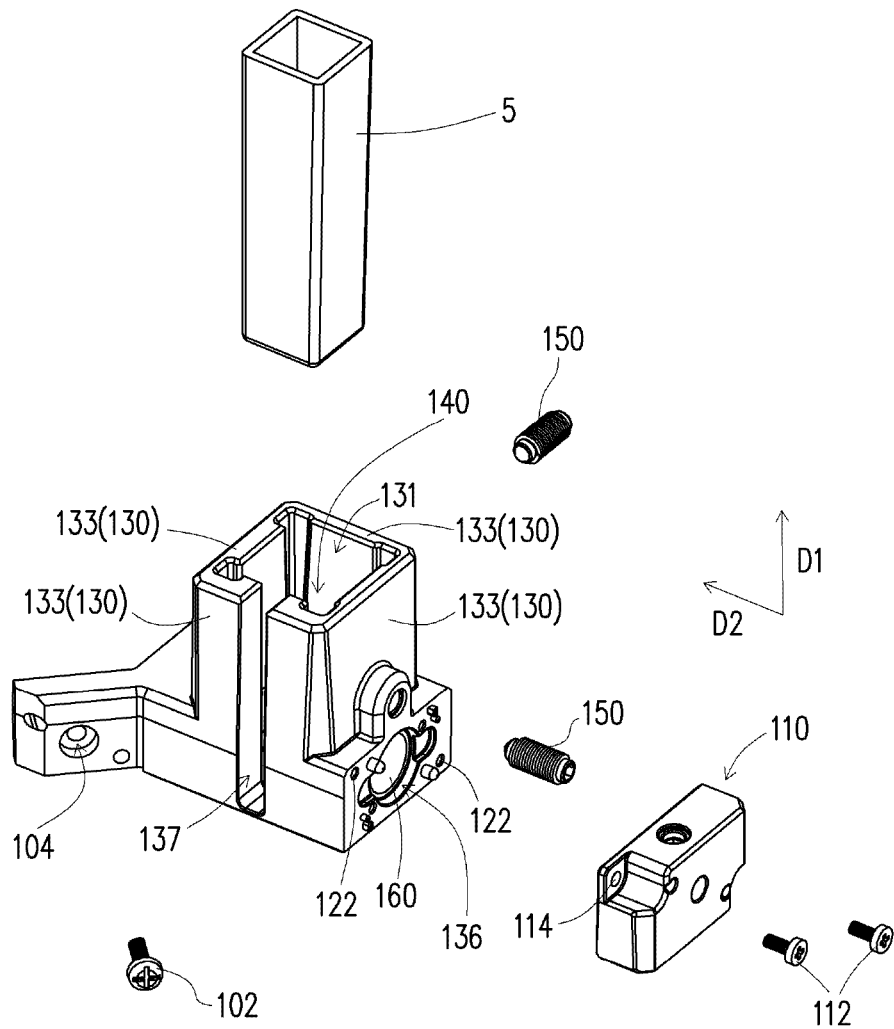
FIG. 2 is an exploded view of FIG. 1.
Figure 3:
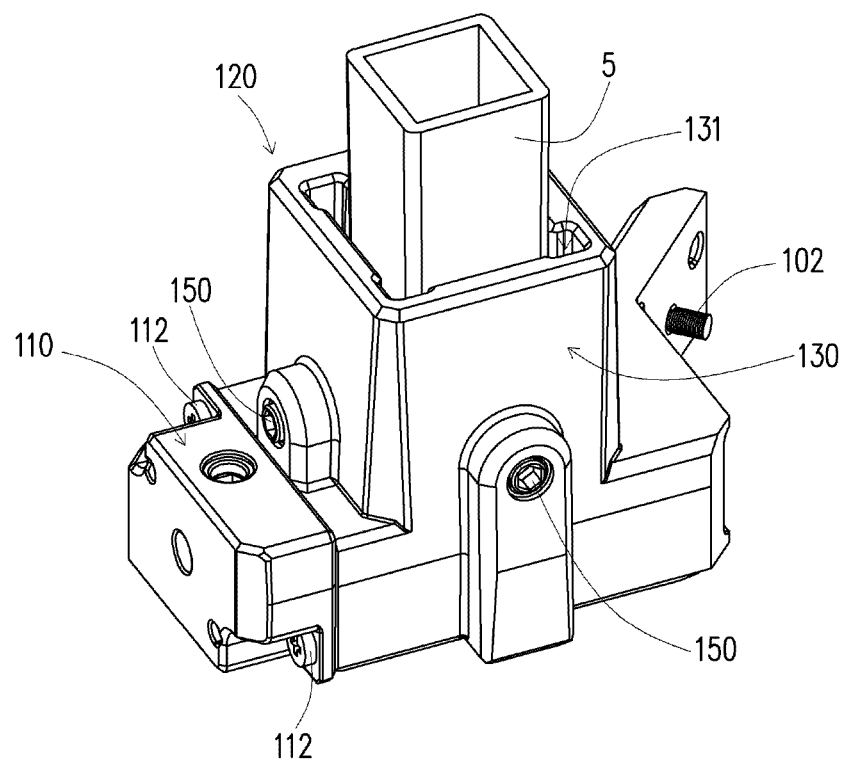
FIG. 3 is a three-dimensional view of FIG. 1 in another viewing angle.
Figure 4:
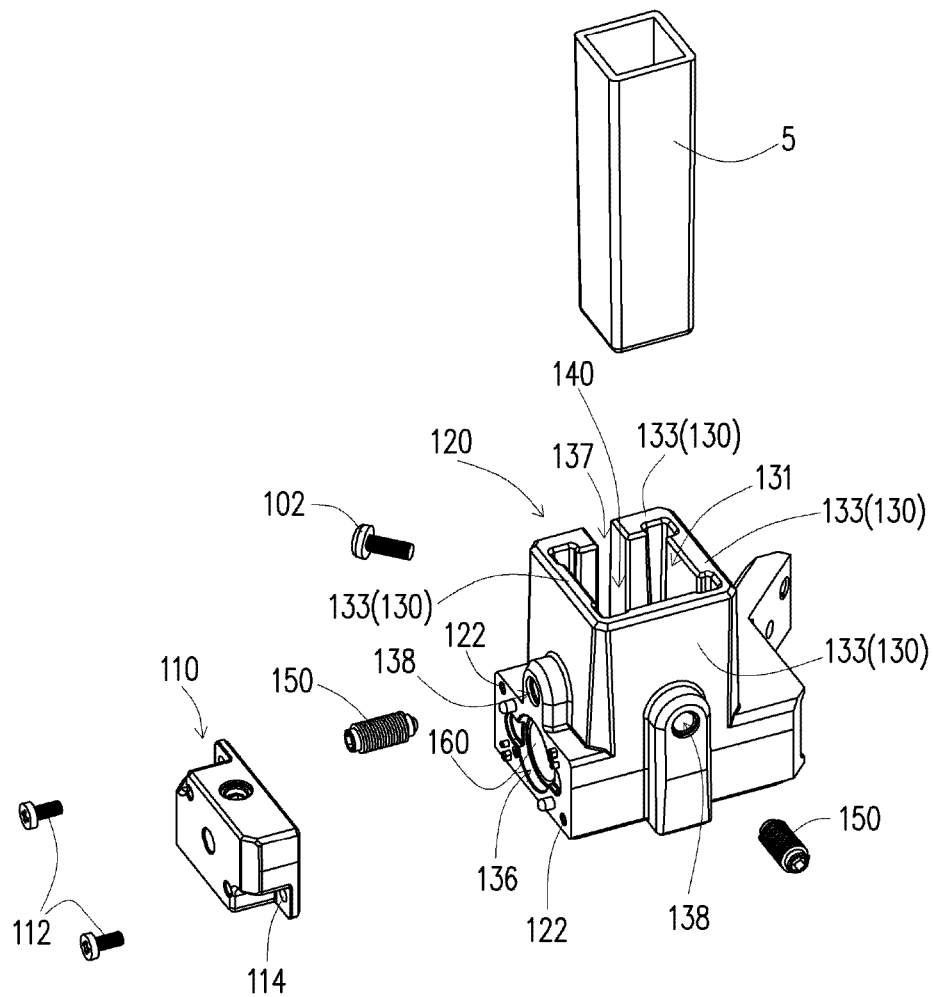
FIG. 4 is an exploded view of FIG. 3.
Figure 5:
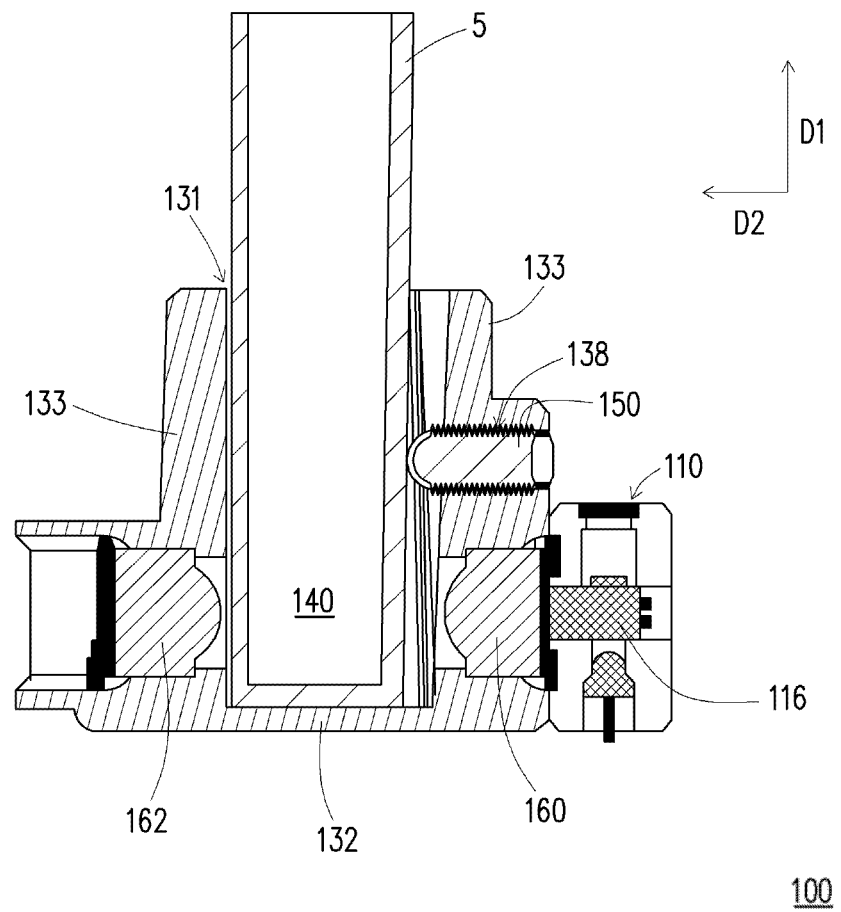
FIG. 5 is a cross-sectional view of FIG. 1.
Figure 6:
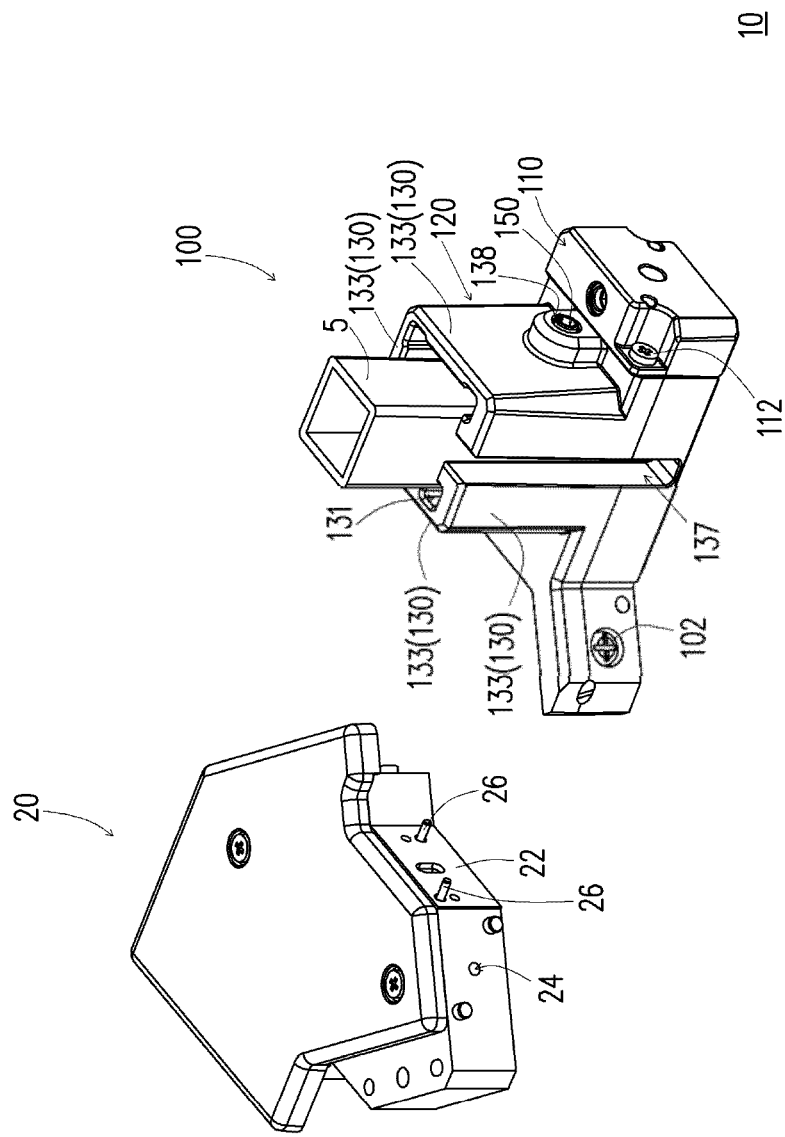
FIG. 6 and FIG. 7 are respectively three-dimensional views of the transmissive sampling module of FIG. 1 and a spectrometer main body before and after assembling.
Figure 7:
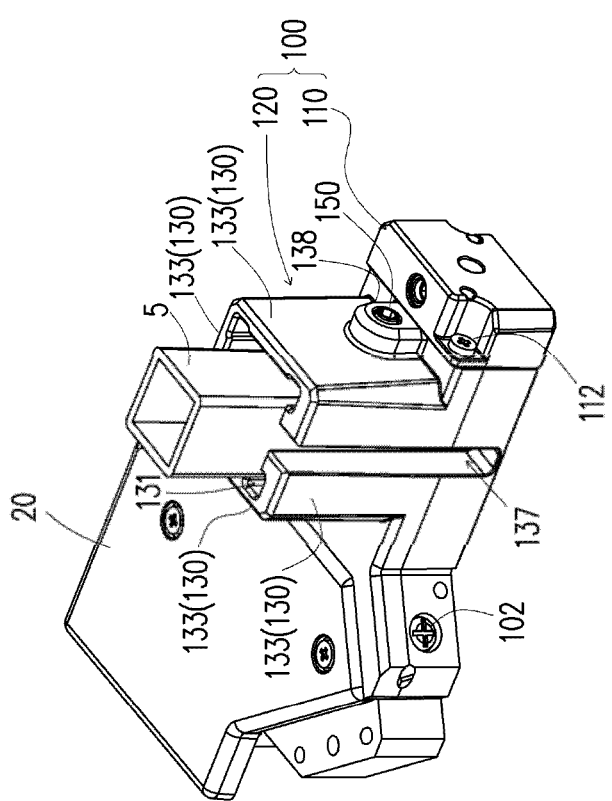

FIG. 1 is a three-dimensional view of a transmissive sampling module and a test tube according to an embodiment of the invention. FIG. 2 is an exploded view of FIG. 1. FIG. 3 is a three-dimensional view of FIG. 1 in another viewing angle. FIG. 4 is an exploded view of FIG. 3. FIG. 5 is a cross-sectional view of FIG. 1. FIG. 6 and FIG. 7 are respectively three-dimensional views of the transmissive sampling module of FIG. 1 and a spectrometer main body before and after assembling. It should be noted that FIG. 1 to FIG. 5 illustrate the transmissive sampling module 100 of the present embodiment, and FIG. 7 illustrates a transmissive spectrometer 10 composed of the transmissive sampling module 100 of FIG. 1 and the spectrometer main body 20.

Referring to FIG. 1 to FIG. 5, the transmissive sampling module 100 of the present embodiment includes a light source assembly 110 and a support base 120. In the present embodiment, the light source assembly 110 is directly connected to the support base 120. In the present embodiment, the light source assembly 110 is detachably connected to the support base 120 to facilitate replacing or repairing the light source assembly 110. For example, an operator may assemble the light source assembly 110 of different light intensities, wavelengths and types (for example, LED or laser, etc.) to the support base 120 to cope with diversified measurement requirements.

In the present embodiment, the light source assembly 110 and the support base 120 have corresponding alignment structures there between, as shown in FIG. 2 and FIG. 4, the light source assembly 110 includes two through holes 114, and the support base 120 includes two screw holes 122 corresponding to the two through holes 114. Two screws 112 may penetrate the two through holes 114 of the light source assembly 110 and are screwed to the two screw holes 122 of the support base 120, such that the light source assembly 110 is aligned with and fixed to the support base 120. Certainly, the method of aligning and fixing the light source assembly 110 to the support base 120 is not limited thereto, and in other embodiments, the light source assembly 110 may also be aligned and fixed to the support base 120 through other manner such as a buckling manner, etc. Moreover, in other embodiments, the light source assembly 110 may also be connected to the support base 120 in a non-detachable manner (for example, a welding manner, etc.), such that the relative position of the light source assembly 110 and the support base 120 is fixed. In the transmissive sampling module 100 of the transmissive spectrometer 10 of the present embodiment, by directly aligning and assembling the light source assembly 110 to the support base 120, the step of using optical fiber tubes to connect the light source assembly 110 and the support base 120 of the conventional technique is omitted, which is more convenient in operation and has a low cost, and is not easy to fall off and suitable for using in a mobile environment.

In the present embodiment, the support base 120 includes a tube body 130 and at least one fixing member 150. The tube body 130 surrounds an accommodating groove 140, where the accommodating groove 140 is used for accommodating a test tube 5, and a tested sample may be disposed in the test tube 5. As shown in FIG. 5, the tube body 130 includes a bottom plate 132 and a plurality of sidewalls 133 extended from the bottom plate 132, where the bottom plate 132 and the sidewalls 133 commonly surround the accommodating groove 140. In the present embodiment, the number of the sidewalls 133 is, for example, four, and a shape of the accommodating groove 140 is a cuboid groove, though the number of the sidewalls 133 is not limited thereto. In other embodiments, the tube body 130 may also be formed by a single sidewall 133 with a single hollow cylindrical shape, or the tube body 130 may also be surrounded by six or eight sidewalls 133.

In the present embodiment, a height of the tube body 130 is greater than a height of the light source assembly 110, and the sidewalls 133 of the tube body 130 may be used for limiting a position of the test tube 5, such that the test tube 5 is not easy to fall down. In an embodiment, the height of the tube body 130 is, for example, between 1.5 to 3 times of the height of the light source assembly 110, though the height of the tube body 130 is not limited thereto.

Moreover, in the present embodiment, the tube body 130 extends along a first direction D1, and in the present embodiment, the first direction D1 is a normal direction of the bottom plate 132, for example, an up and down direction of FIG. 5, namely, the sidewalls 133 extends along a direction perpendicular to the bottom plate 132. Certainly, the first direction D1 is not limited thereto. Moreover, a light emitted by a light source 116 of the light source assembly 110 is propagated along a second direction D2 (for example, a left and right direction of FIG. 5). In the present embodiment, the extending direction of the tube body 130 is not parallel to a direction of an optical path of the light source assembly 110, i.e. the first direction D1 is not parallel to the second direction D2. To be specific, in the present embodiment, the first direction D1 is, for example, perpendicular to the second direction D2, though the relationship between the first direction D1 and the second direction D2 is not limited thereto, and in other embodiments, the first direction D1 and the second direction D2 may also include a non-zero angle other than 90 degrees.

As shown in FIG. 2 and FIG. 4, the tube body 130 of the support base 120 includes a transparent portion 136. In the present embodiment, the transparent portion 136 is, for example, a void, and the light emitted by the light source 116 may pass through the transparent portion 136 to enter the accommodating groove 140. In other embodiments, the transparent portion 136 may also be a transparent wall, for example, all of or a part of the tube body 130 is made of a transparent material such as acrylics or glass, etc., such that the light emitted by the light source 116 may pass through the transparent portion 136 of the tube body 130 to enter the accommodating groove 140, so as to reach the test tube 5 disposed in the accommodating groove 140.

Moreover, as shown in FIG. 5, the transmissive sampling module 100 further includes at least one optical device 160, 162 disposed in the support base 120 and located on the optical path of the light source assembly 110, so as to provide a specific optical effect. In the present embodiment, the transmissive sampling module 100 includes two optical devices 160, 162 disposed in the support base 120 and located at two opposite sides of the accommodating groove 140. Certainly, the number and configuration positions of the optical devices 160, 162 are not limited thereto. The optical devices 160, 162, for example, respectively include a non-planar lens such as a biconcave lens, a biconvex lens, a convex-concave lens, a concave-convex lens, a plano-convex lens and a plano-concave lens, though the types of the optical devices 160, 162 are not limited thereto. Moreover, in the present embodiment, the types of the optical devices 160, 162 are, for example, the same, though in other embodiments, the types of the optical devices 160, 162 may also be different.

In the present embodiment, at least one first slit 137 is formed on one of the sidewalls 133 and extends along the normal direction of the bottom plate 132, and the at least one first slit 137 communicates with the accommodating groove 140. The first slit 137 may be used for observing whether the test tube 5 in the accommodating groove 140 is placed at a right position, and may be used for placing a sheet-like sample, or used for cleaning the accommodating groove 140.

In the present embodiment, the tube body 130 has one first slit 137, and the first slit 137 extends from one edge to another edge of the sidewall 133, that two edges respectively are the most close to the bottom plate 132 and the most far away from the bottom plate 132. In other words, in the preened embodiment, a length of the first slit 137 is close to the height of the corresponding sidewall 133. Certainly, in other embodiments, the length of the first slit 137 may also be smaller than the height of the corresponding sidewall 133, for example, the length of the first slit 137 may also be ½ to ⅔ of the height of the sidewall 133. The first slit 137 may also extend from the edge of the corresponding sidewall 133 that is the most close to the bottom plate 132 to a middle portion of the sidewall 133, which is not limited by the invention.

Moreover, in the present embodiment, the first slit 137 is formed at a center of the sidewall 133, and the distance between the first slit 137 and the left sidewall 133, as well as the distance between the first slit 137 and right sidewall 133 are the same, though in other embodiments, the first slit 137 may be not formed at the center of the sidewall 133, but is located closer to one of the sidewalls 133 (the left sidewall 133 or the right sidewall 133). Moreover, in other embodiments, the number of the first slit 137 may be plural, for example, two first slits 137 are formed on two opposite sidewalls 133 or two adjacent sidewalls 133, and the number and the configuration positions of the first slits 137 are not limited thereto.

Moreover, in the present embodiment, at least one fixing member 150 is disposed on the tube body 130 and is adjustably protruded out of an inner surface of the tube body 130. As shown in FIG. 4, in the present embodiment, there are two fixing members 150, and the fixing members 150 are, for example, screws, though the number and the type of the fixing members 150 are not limited thereto. The two adjacent sidewalls 133 of the tube body 130 include two penetrated screw holes 138, and the two fixing members 150 are disposed in the two screw holes 138 of the tube body 130, and are protruded out of the inner surface of the tube body 130 as that shown in FIG. 5. In the present embodiment, the fixing members 150 may be rotated relative to the tube body 130 to move forward or backward, so as to be adjusted to a position adapted to stably lean against and fix the test tube 5 disposed in the accommodating groove 140. Namely, after the test tube 5 is placed in the accommodating groove 140 of the support base 120 of the transmissive sampling module 100, the operator may adjust a height of the fixing members 150 protruding out of the inner surface of the tube body 130 to make the fixing members 150 to lean against the test tube 5. In this way, stableness of the test tube 5 placed in the accommodating groove 140 is improved, so as to enhance measurement accuracy. It should be noted that in other embodiments, the two fixing members 150 may also be disposed on two opposite sidewalls 133, and the positions of the fixing members 150 are not limited thereto.

Referring to FIG. 6 and FIG. 7, after the transmissive sampling module 100 of FIG. 1 is assembled to the spectrometer main body 20, the transmissive spectrometer 10 of FIG. 7 is constructed. As shown in FIG. 6, the spectrometer main body 20 includes a light incident surface 22. The transmissive sampling module 100 is detachably and directly connected to the spectrometer main body 20, and the transmissive sampling module 100 contacts the light incident surface 22. In the present embodiment, the spectrometer main body 20 includes a screw hole 24, and the transmissive sampling module 100 includes a through hole 104 (indicated in FIG. 2) corresponding to the screw hole 24, a screw 102 passes through the through hole 104 of the transmissive sampling module 100 and is screwed to the screw hole 24 of the spectrometer main body 20, so as to align and fix the transmissive sampling module 100 to the spectrometer main body 20.

Moreover, as shown in FIG. 6, the spectrometer main body 20 may include positioning columns 26, and the transmissive sampling module 100 may include positioning holes (not shown) at locations corresponding to the positioning columns 26, and positioning accuracy between the spectrometer main body 20 and the transmissive sampling module 100 may be increased through the positioning columns 26 and the positioning holes. Certainly, the method of aligning and fixing the transmissive sampling module 100 to the spectrometer main body 20 is not limited thereto, and in other embodiments, the transmissive sampling module 100 may also be aligned and fixed to the spectrometer main body 20 through other manner such as a way of engagement, etc. Compared to the conventional technique where additional optical fiber tubes (not shown) are applied to connect the optical path between the transmissive sampling module 100 and the spectrometer main body 20, the transmissive spectrometer 10 of the present embodiment is simpler in assembling, and has a low cost and is easy to be used in a mobile environment.

Transmissive sampling modules 100a, 100b, 100c of other implementations are introduced below. It should be noted that in the following embodiments, only main differences between different embodiments are described, and the same or similar devices are denoted by the same or similar referential numbers, and descriptions thereof are omitted.

Figure 8:
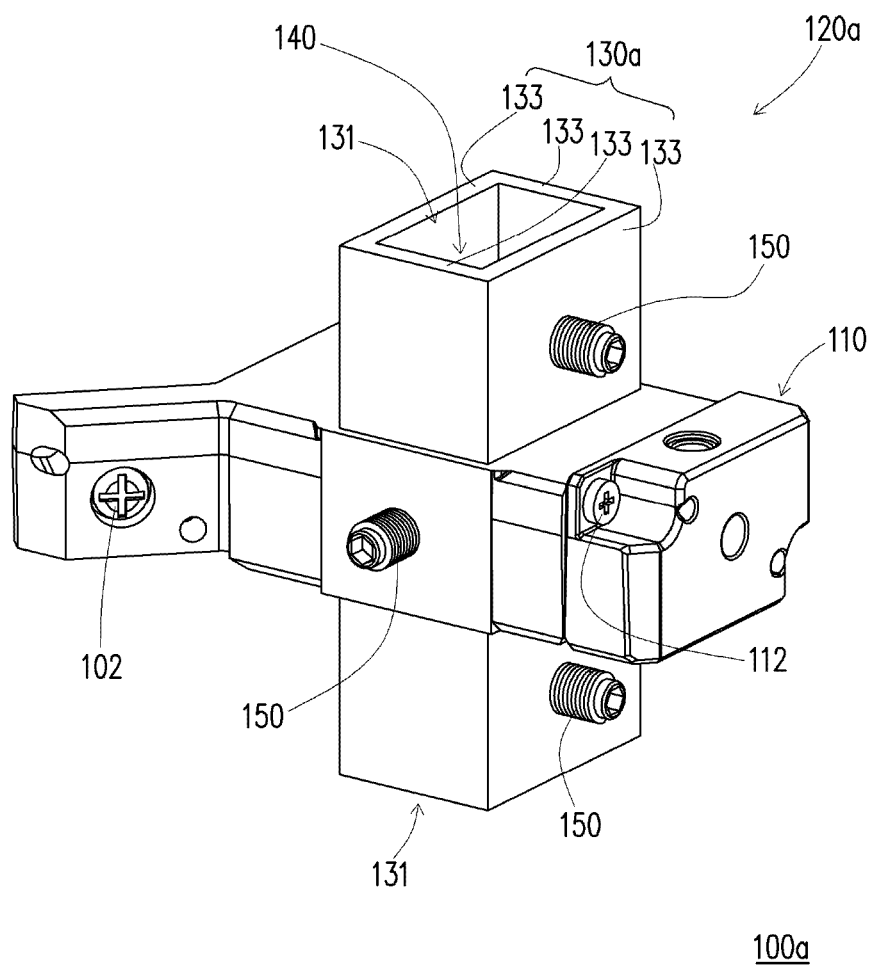
FIG. 8 is a three-dimensional view of a transmissive sampling module according to another embodiment of the invention.
Figure 9:
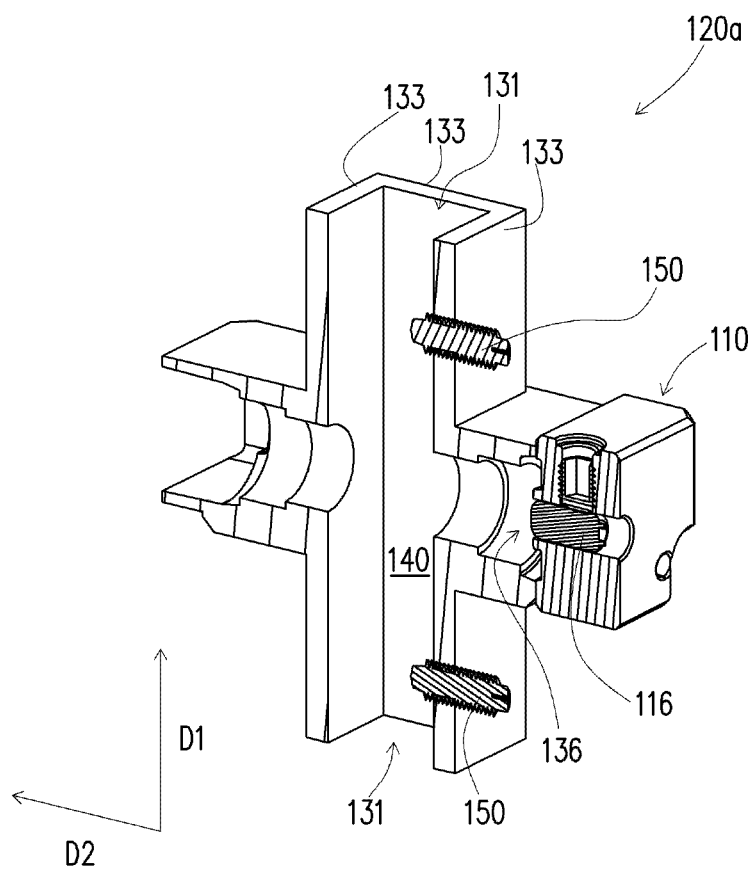
FIG. 9 is a cross-sectional view of the transmissive sampling module of FIG. 8.
Figure 10:
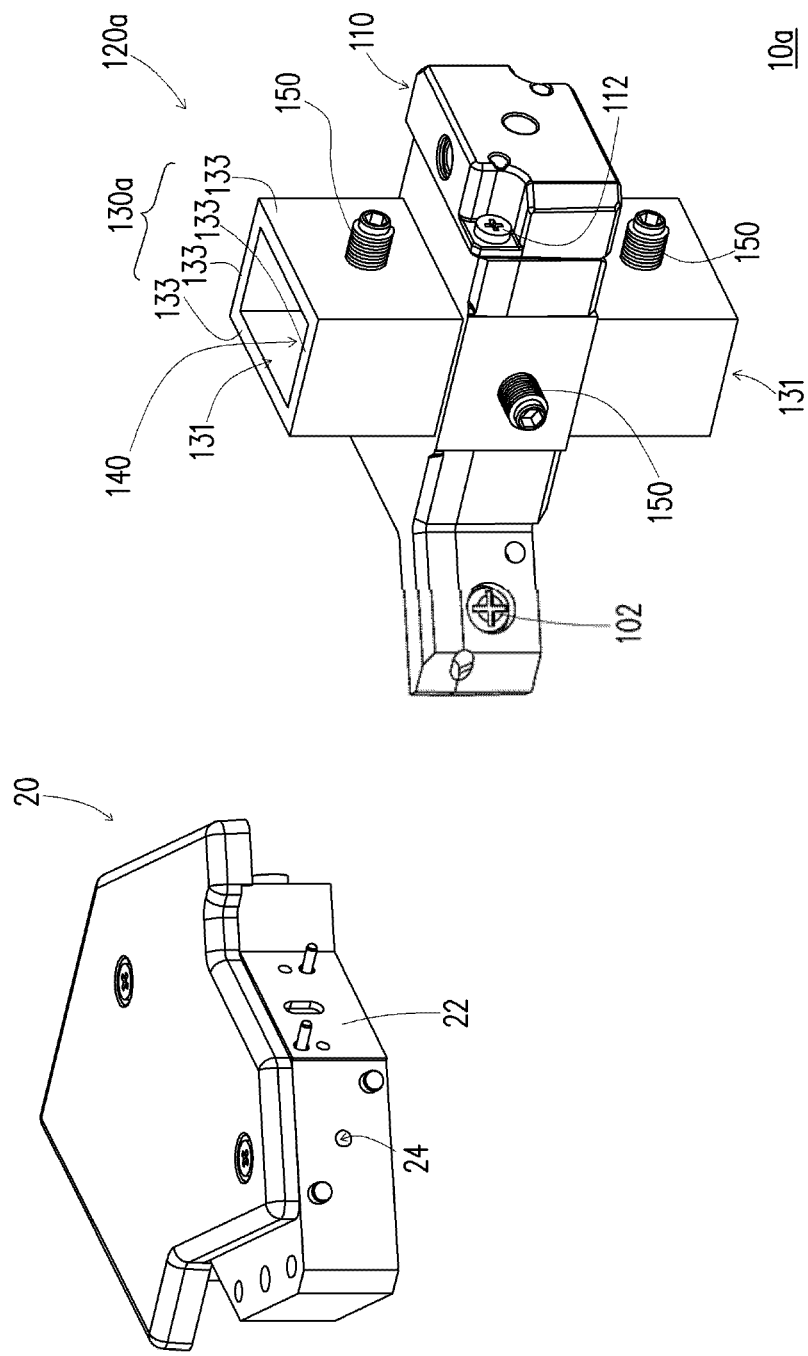
FIG. 10 and FIG. 11 are respectively three-dimensional views of the transmissive sampling module of FIG. 8 and a spectrometer main body before and after assembling.
Figure 11:
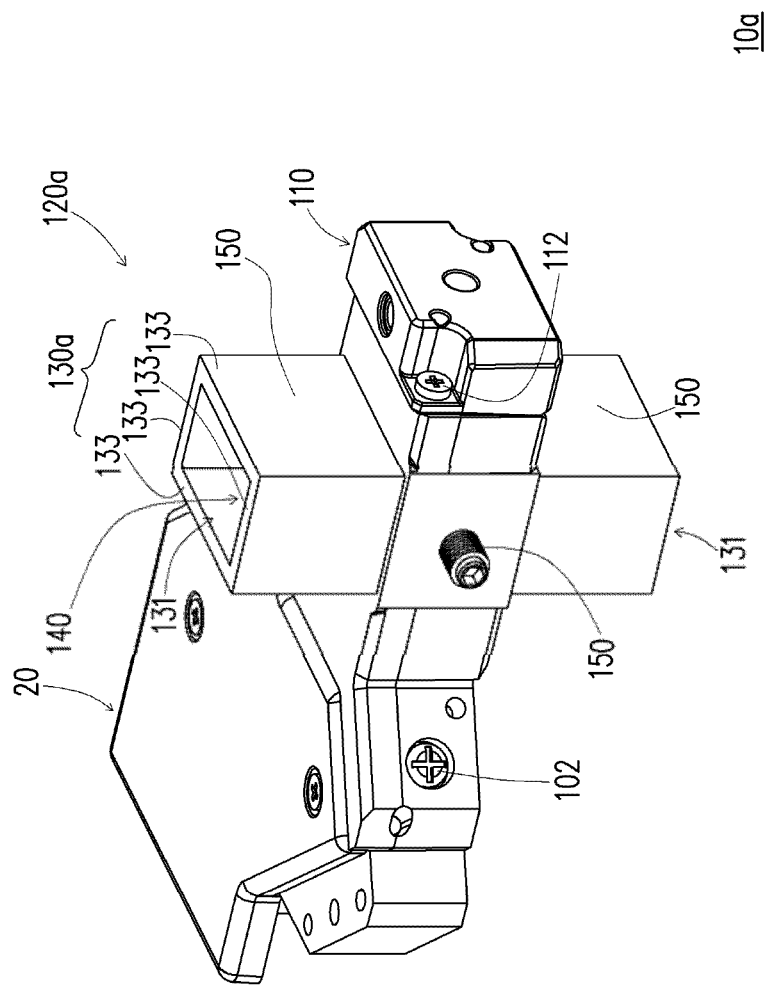

FIG. 8 is a three-dimensional view of a transmissive sampling module according to another embodiment of the invention. FIG. 9 is a cross-sectional view of the transmissive sampling module of FIG. 8. FIG. 10 and FIG. 11 are respectively three-dimensional views of the transmissive sampling module of FIG. 8 and a spectrometer main body before and after assembling. It should be noted that FIG. 8 to FIG. 9 illustrate the transmissive sampling module 100a of the present embodiment, and FIG. 11 illustrates a transmissive spectrometer 10a composed of the transmissive sampling module 100a of FIG. 8 and the spectrometer main body 20.

Referring to FIG. 8 to FIG. 11, a main difference between the transmissive sampling module 100a of FIG. 8 and the transmissive sampling module 100 of FIG. 1 lies in different forms of the tube bodies 130, 130a and different numbers of the fixing members 150. In detail, as shown in FIG. 8 and FIG. 9, in the present embodiment, the tube body 130a includes a plurality of sidewalls 133, and the sidewalls 133 commonly surround the accommodating groove 140, and the tube body 130a has two openings 131 at two opposite ends. The tube body 130a of the present embodiment does not have a bottom plate, and is adapted to be penetrated by a pipe-like or bar-like test tube (not shown), and a flowing fluid may be introduced to the test tube, so that the transmissive spectrometer 10 shown in FIG. 11 may measure the flowing fluid. In the present embodiment, since the tube body 130a is relatively long, a plurality of fixing members 150 (for example, two fixing members 150) may be configured on a same sidewall 133 to fix the position of the test tube disposed in the tube body 130a. Moreover, in FIG. 8, the three fixing members 150 may be configured at positions of different heights according to an actual requirement. Certainly, the number and the configuration positions of the fixing members 150 are not limited thereto.

Similarly, in the present embodiment, the tube body 130a extends along the first direction D1, and the optical path of the light source assembly 110 extends along the second direction D2, and the extending direction of the tube body 130a is perpendicular to the optical path of the light source assembly 110. Certainly, in other embodiments, the spirit of the invention is met as long as the extending direction of the tube body 130a is not parallel to the optical path of the light source assembly 110.

Figure 12:
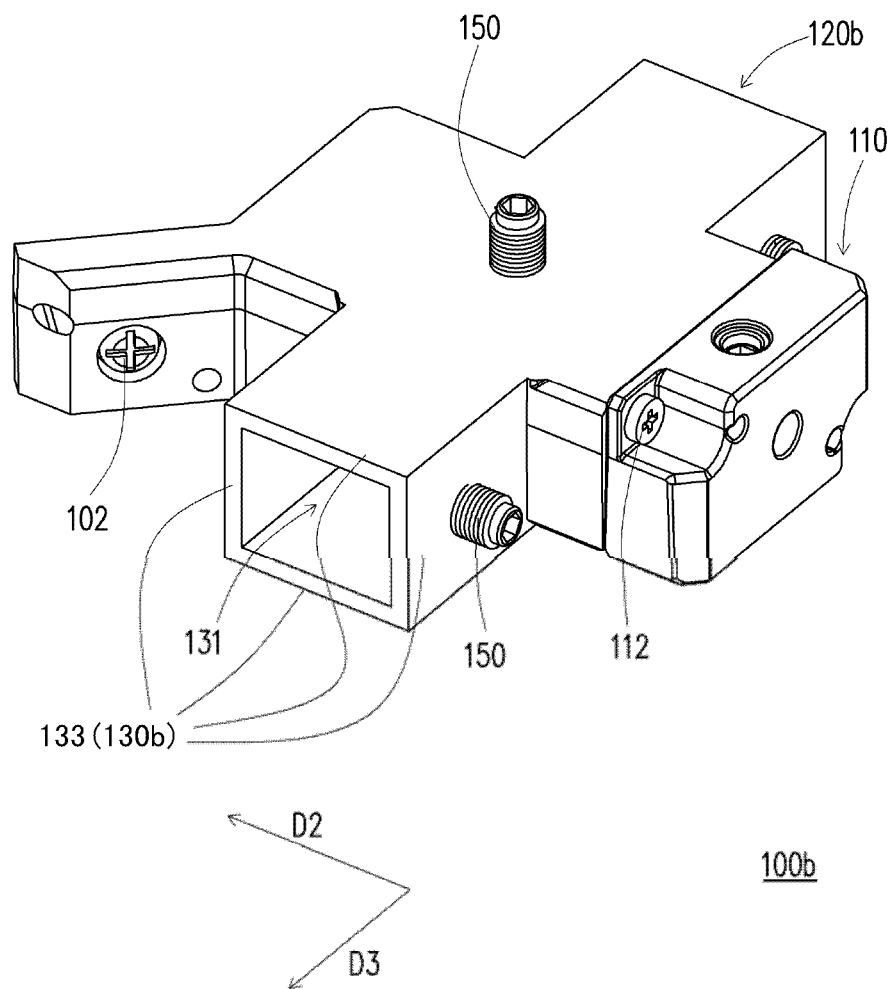
FIG. 12 is a three-dimensional view of a transmissive sampling module according to another embodiment of the invention.
Figure 13:
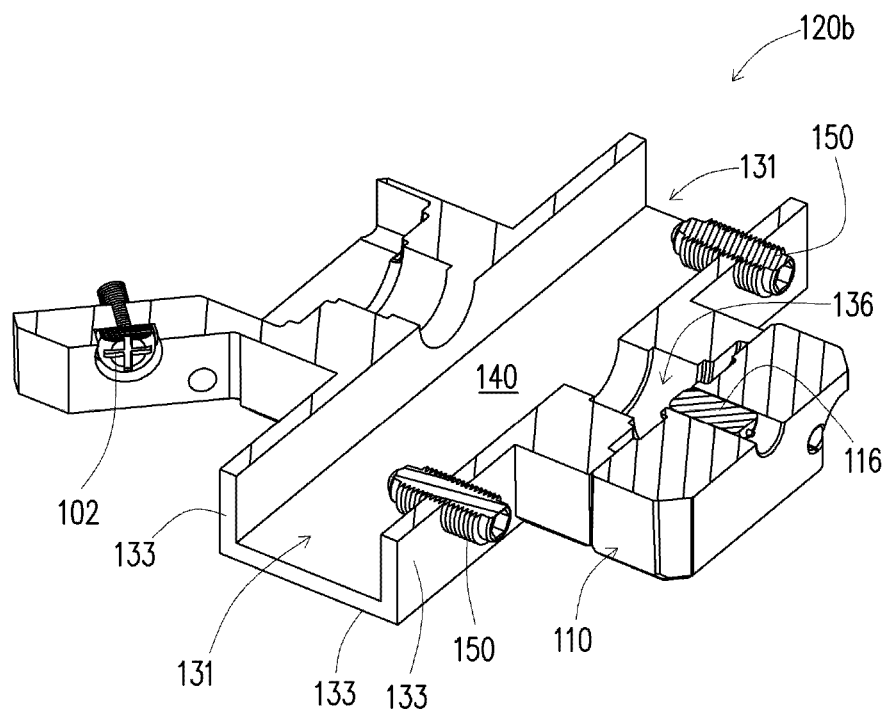
FIG. 13 is a cross-sectional view of the transmissive sampling module of FIG. 12.
Figure 13:
Figure 14:
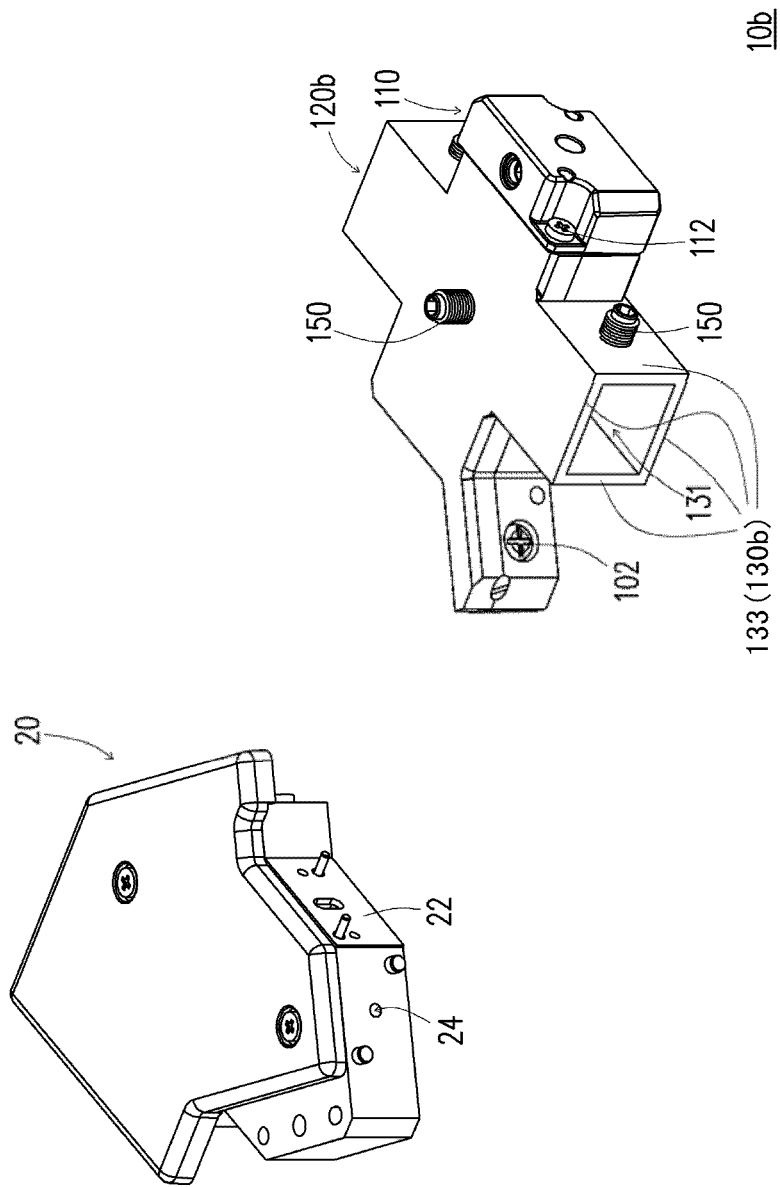
FIG. 14 and FIG. 15 are respectively three-dimensional views of the transmissive sampling module of FIG. 12 and a spectrometer main body before and after assembling.
Figure 15:
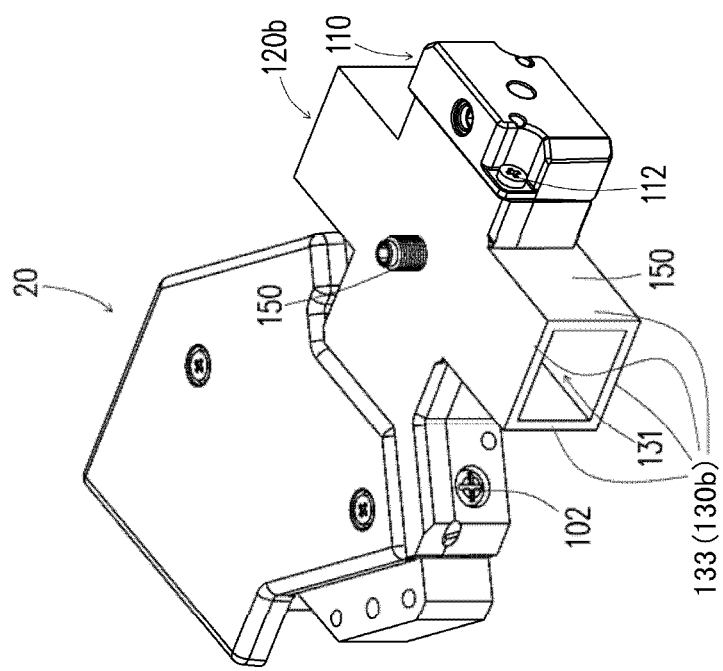

FIG. 12 is a three-dimensional view of a transmissive sampling module according to another embodiment of the invention. FIG. 13 is a cross-sectional view of the transmissive sampling module of FIG. 12. FIG. 14 and FIG. 15 are respectively three-dimensional views of the transmissive sampling module of FIG. 12 and a spectrometer main body before and after assembling. It should be noted that FIG. 12 to FIG. 13 illustrate the transmissive sampling module 100b of the present embodiment, and FIG. 15 illustrates a transmissive spectrometer 10b composed of the transmissive sampling module 100b of FIG. 12 and the spectrometer main body 20.

Referring to FIG. 12 to FIG. 13, a main difference between the transmissive sampling module 100b of FIG. 12 and the transmissive sampling module 100a of FIG. 8 lies in different extending directions of the tube bodies 130a, 130b. In FIG. 8, the tube body 130a extends along the first direction D1 (for example, the up and down direction of FIG. 8), and in FIG. 12, the tube body 130b extends along a third direction D3 (for example, a front and back direction of FIG. 12). As shown in FIG. 13, in the present embodiment, the optical path of the light source assembly 110 extends along the second direction D2, the extending direction (the third direction) of the tube body 130b is perpendicular to the optical path (the second direction D2) of the light source assembly 110. Certainly, the spirit of the invention is met as long as the extending direction of the tube body 130b is not parallel to the optical path of the light source assembly 110.

In the present embodiment, the tube body 130b has two openings 131 at two opposite ends. The tube body 130b is adapted to be penetrated by a pipe-like or bar-like test tube 5, and a flowing fluid may be introduced to the test tube 5, so that the transmissive spectrometer 10b shown in FIG. 15 may measure the flowing fluid. It should be noted that the operator may combine the spectrometer main body 20 with the transmissive sampling module 100a of FIG. 8 or the transmissive sampling module 100b of FIG. 12 according to a flowing direction of the fluid to be measured, so as to construct the transmissive spectrometer 10a of FIG. 11 or the transmissive spectrometer 10b of FIG. 15 according to an actual requirement.

Figure 16:
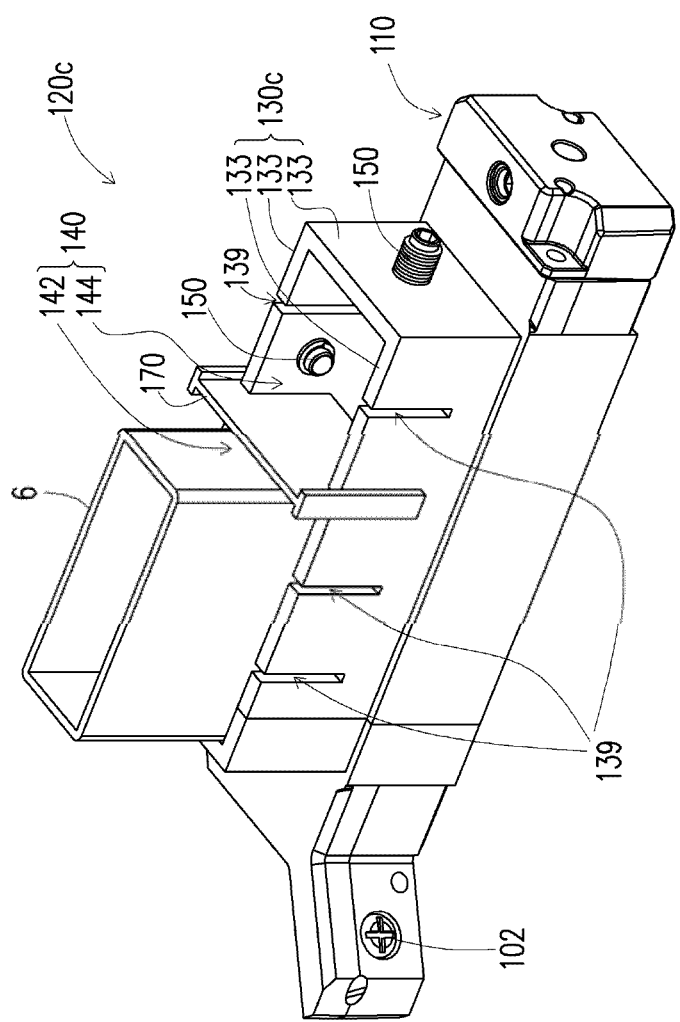
FIG. 16 is a three-dimensional view of a transmissive sampling module according to another embodiment of the invention.
Figure 17:
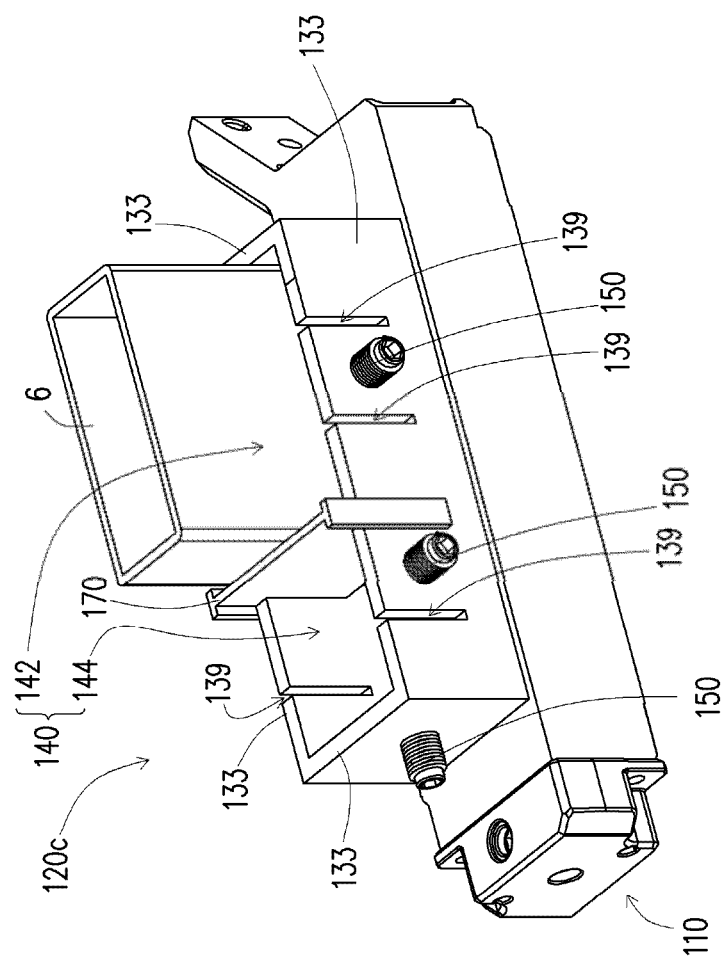
FIG. 17 is a three-dimensional view of the transmissive sampling module of FIG. 16 in another viewing angle.
Figure 18:
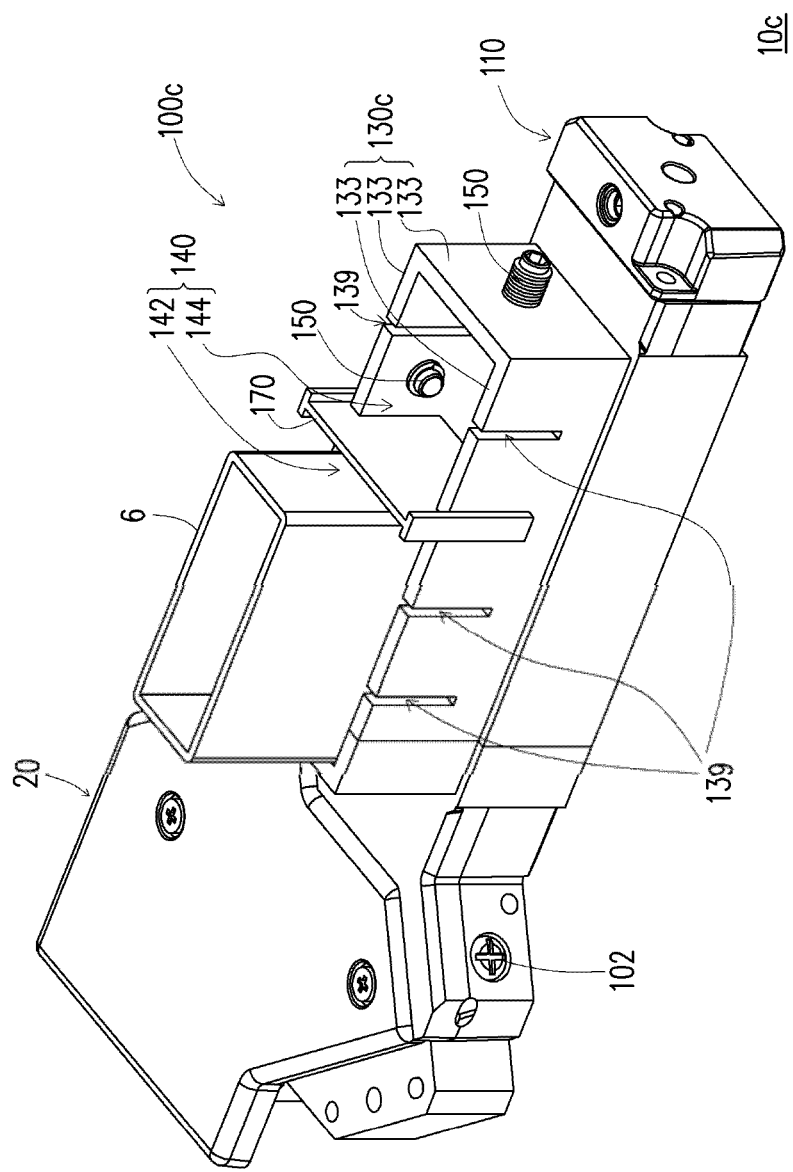
FIG. 18 is a three-dimensional view of the transmissive sampling module of FIG. 16 and a spectrometer main body after assembling.

FIG. 16 is a three-dimensional view of a transmissive sampling module according to another embodiment of the invention. FIG. 17 is a three-dimensional view of the transmissive sampling module of FIG. 16 in another viewing angle. FIG. 18 is a three-dimensional view of the transmissive sampling module of FIG. 16 and a spectrometer main body after assembling. It should be noted that FIG. 16 to FIG. 17 illustrate the transmissive sampling module 100c of the present embodiment, and FIG. 18 illustrates a transmissive spectrometer 10c composed of the transmissive sampling module 100c of FIG. 16 and the spectrometer main body 20.

Referring to FIG. 16 to FIG. 18, a main difference between the transmissive sampling module 100c of FIG. 16 and the transmissive sampling module 100 of FIG. 1 lies in different forms of the tube bodies 130, 130c. Since different types of samples have different light absorptions, regarding the sample with a low light absorption rate, it is required to prolong a path of the light passing through the sample in order to make the spectrometer main body 20 to measure enough signal intensity. Therefore, in response to the needs of different samples, a size of a test tube 6 is accordingly changed. The tube body 130c of the present embodiment may apply the above test tubes 6 of different sizes, so as to enhance application flexibility.

In the present embodiment, at least two second slits 139 are respectively formed on two opposite sidewalls of the sidewalls 133, and are located at opposite positions on the two opposite sidewalls 133. To be specific, as shown in FIG. 16 and FIG. 17, on the two opposite sidewalls 133 with a larger size, eight second slits 139 are symmetrically formed on the two sidewalls 133 in pairs. Certainly, the configuration positions and the number of the second slits 139 are not limited thereto.

The support base 120c further includes a separation plate 170 inserted in two of the at least two second slits 139 located at the opposite positions on the two opposite sidewalls 133, so as to separate the accommodating groove 140 into regions of different sizes. In the present embodiment, the operator may determine the two second slits 139 in which the separation plate 170 is inserted according to the size of the test tube 6, so as to separate the accommodating slot 140 into a first sub-groove 142 and a second sub-groove 144, and the test tube 6 may be accommodated in one of the first sub-groove 142 and the second sub-groove 144.

Therefore, in the transmissive sampling module 100c of the present embodiment, the sizes of the first sub-groove 142 and the second sub-groove 144 are adjusted by inserting the separation plate 170 in different second slits 139, such that the size of one of the first sub-groove 142 and the second sub-groove 144 corresponds to the size of the test tube 6. Moreover, in order to stably fix the test tube 6 located in the first sub-groove 142 or the second sub-groove 144, the operator may further adjust the positions of the fixing members 150, such that the fixing members 150 lean against the test tube 6 to increase measurement accuracy.

Figure 19:
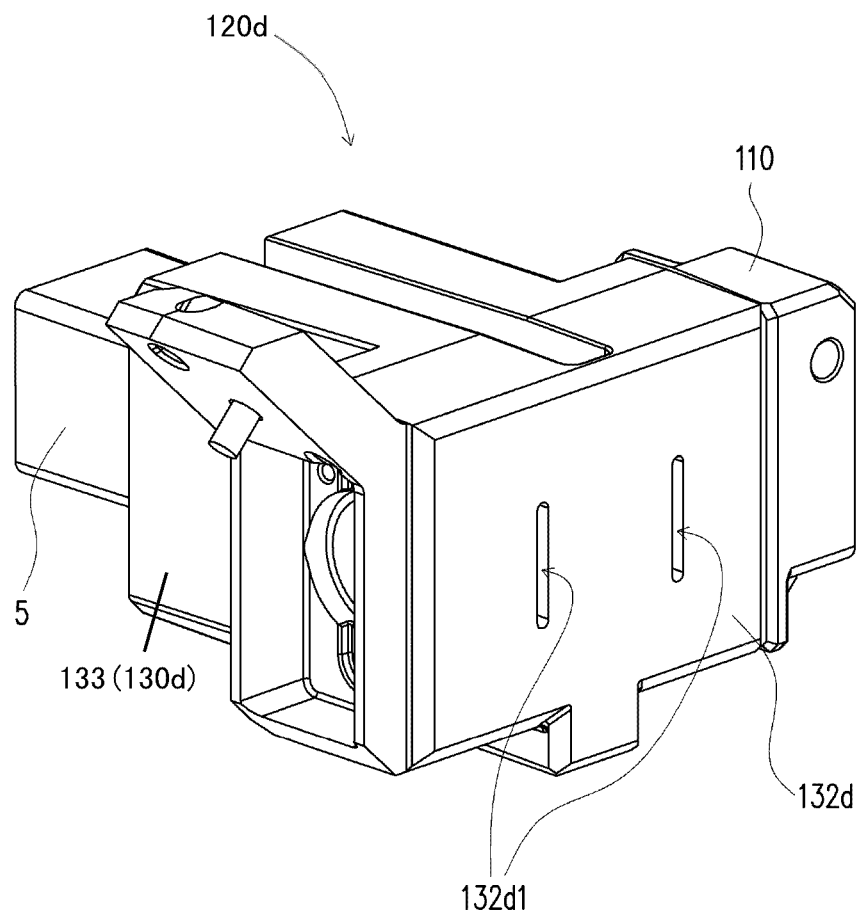
FIG. 19 is a three-dimensional view of a transmissive sampling module according to another embodiment of the invention.
Figure 20:
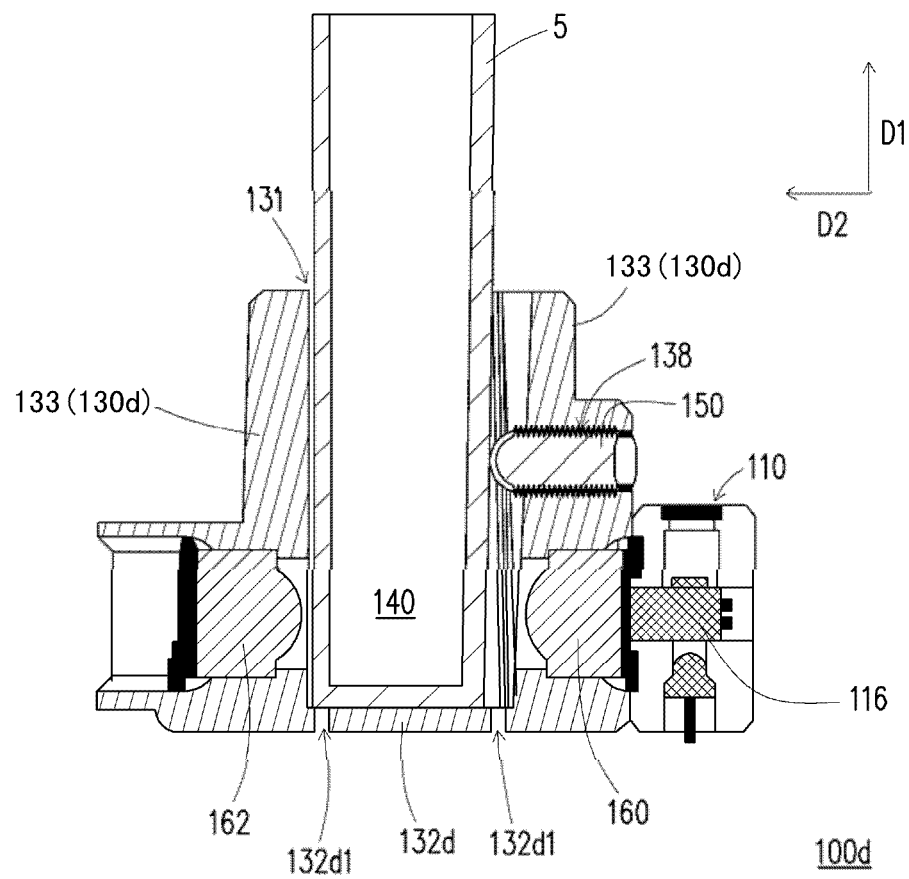
FIG. 20 is a cross-sectional view of FIG. 19.

FIG. 19 is a three-dimensional view of a transmissive sampling module according to another embodiment of the invention. FIG. 20 is a cross-sectional view of FIG. 19. Referring to FIG. 19 and FIG. 20, a main difference between the transmissive sampling module 100d of FIG. 19 and the transmissive sampling module 100 of FIG. 1 is that the bottom plate 132d of the tube body 10d includes at least one through hole 132d1 communicating with the accommodating groove 140 in the transmissive sampling module 100d of FIG. 19. Since a material of the test tube 5 is, for example, glass, it is probably cracked during a test process, and the sample originally kept in the test tube 5 is leaked to cause pollution in the tube body 130d, and the optical devices 160 and 162 located at two sides of the tube body 130d are polluted. In the present embodiment, since the bottom plate 132d has the through holes 132d1 communicating with the accommodating groove 140, if the test tube 5 is cracked, the leaked sample may flow out from the through holes 132d1 of the bottom plate 132d without being accumulated in the tube body 130d. In this way, a chance that the sample pollutes the tube body 130d and the optical devices 160, 162 located at two sides of the tube body 130d due to leakage is decreased.

In the present embodiment, the number of the through holes 132d1 is, for example, two, and the two through holes 132d1 are respectively located on the bottom plate 132d at positions close to the two optical devices 160, 162, and a shape of the through hole 132d1 may be a bar shape. Certainly, in other embodiments, the number of the through holes 132d1 may be one or plural, and the shape of the through hole 132d1 may be a round shape or other shapes, and the shape, the number and the configuration positions of the through holes 132d1 are not limited thereto.

In summary, in the transmissive sampling module of the transmissive spectrometer of the invention, by directly aligning and assembling the light source assembly to the support base, the step of using optical fiber tubes to connect the light source assembly and the support base of the conventional technique is omitted, which is more convenient in operation and has a low cost. Moreover, the tube body of the support base surrounds the accommodating groove used for accommodating the test tube. The fixing members are disposed on the tube body and adjustably protruded out of the inner surface of the tube body, so as to fix the test tube disposed in the accommodating groove. In this way, stableness of the test tube disposed in the accommodating groove is enhanced to increase measurement accuracy. Moreover, the tube body of the support base of the transmissive sampling module may have a bottom surface to support the test tube, and the tube body may also have openings at two opposite ends thereof such that the test tube may penetrate through the tube body to facilitate measuring the flowing fluid. Alternatively the tube body may also have the second slits for inserting the separation plate, and the size of the accommodating groove is adjusted through the separation plate, so as to match the test tube of different sizes.

Alternatively, the bottom plate of the tube body may have the through holes communicating with the accommodating groove, such that the leaked sample may flow out from the through holes, so as to decrease a chance of polluting the tube body and the optical devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first longitudinal direction, the second longitudinal direction, the first side, the second side, the third side, the fourth side, the first corner end, the second corner end, the first row, and the second row are only used for distinguishing various elements and do not limit the number of the elements.

What is claimed is:

1. A transmissive sampling module, adapted to a spectrometer main body, the transmissive sampling module comprising:
    a light source assembly, directly connected to the support base; and
    a support base, comprising:
        a tube body, surrounding an accommodating groove, wherein an extending direction of the tube body is not parallel to an optical path of the light source assembly, the tube body comprises a transparent portion, and the optical path of the light source assembly passes through the transparent portion and the accommodating groove; and
        at least one fixing member, disposed on the tube body, and adjustably protruded out of an inner surface of the tube body.

2. The transmissive sampling module as claimed in claim 1, wherein the tube body comprises a bottom plate and a plurality of sidewalls extended from the bottom plate, wherein the bottom plate and the sidewalls commonly surround the accommodating groove, and a normal direction of the bottom plate is perpendicular to the optical path of the light source assembly.

3. The transmissive sampling module as claimed in claim 2, wherein at least one first slit is formed on one of the sidewalls and extends along the normal direction of the bottom plate, and the at least one first slit communicates with the accommodating groove.

4. The transmissive sampling module as claimed in claim 2, wherein at least two second slits are respectively formed on two opposite sidewalls of the sidewalls, and are located at opposite positions on the two opposite sidewalls, the support base further comprises a separation plate inserted in two of the at least two second slits located at the opposite positions on the two opposite sidewalls, so as to separate the accommodating groove into regions of different sizes.

5. The transmissive sampling module as claimed in claim 1, wherein the tube body comprises a plurality of sidewalls, the sidewalls commonly surround the accommodating groove, the tube body has two openings at two opposite ends, and the extending direction of the tube body is perpendicular to the optical path of the light source assembly.

6. The transmissive sampling module as claimed in claim 1, wherein the light source assembly is detachably connected to the support base.

7. The transmissive sampling module as claimed in claim 1, further comprising:
    an optical device, disposed in the support base, and located on the optical path of the light source assembly.

8. A transmissive spectrometer, comprising:
    a spectrometer main body, comprising a light incident surface;

a transmissive sampling module, detachably connected to the spectrometer main body, and contacting the light incident surface, the transmissive sampling module comprising:
  a light source assembly; and
  a support base, the light source assembly directly connected to the support base, the support base comprising:
    a tube body, surrounding an accommodating groove, wherein an extending direction of the tube body is not parallel to an optical path of the light source assembly, the tube body comprises a transparent portion, and the optical path of the light source assembly passes through the transparent portion and the accommodating groove;
    at least one fixing member, disposed on the tube body, and adjustably protruded out of an inner surface of the tube body.

9. The transmissive spectrometer as claimed in claim 8, wherein the tube body comprises a bottom plate and a plurality of sidewalls, wherein the bottom plate and the sidewalls commonly surround the accommodating groove, and a normal direction of the bottom plate is perpendicular to the optical path of the light source assembly.

10. The transmissive spectrometer as claimed in claim 9, wherein at least one first slit is formed on one of the sidewalls and extends along the normal direction of the bottom plate, and the at least one first slit communicates with the accommodating groove.

11. The transmissive spectrometer as claimed in claim 9, wherein at least two second slits are respectively formed on two opposite sidewalls of the sidewalls, and are located at opposite positions on the two opposite sidewalls, the support base further comprises a separation plate inserted in two of the at least two second slits located at the opposite positions on the two opposite sidewalls, so as to separate the accommodating groove into regions of different sizes.

12. The transmissive spectrometer as claimed in claim 8, wherein the tube body comprises a plurality of sidewalls, the sidewalls commonly surround the accommodating groove, the tube body has two openings at two opposite ends, and the extending direction of the tube body is perpendicular to the optical path of the light source assembly.

13. The transmissive spectrometer as claimed in claim 8, wherein the light source assembly is detachably connected to the support base.

14. The transmissive spectrometer as claimed in claim 8, further comprising:
  an optical device, disposed in the support base, and located on the optical path of the light source assembly.

15. A transmissive sampling module, adapted to a spectrometer main body, the transmissive sampling module comprising:
  a support base, the support base comprising a tube body and at least one fixing member,
  wherein the tube body comprises a bottom plate and a plurality of sidewalls extended from the bottom plate, the bottom plate and the sidewalls commonly surround an accommodating groove, wherein one of the sidewalls comprises a transparent portion, and a light is incident to the accommodating groove through the transparent portion, and the bottom plate comprises at least one through hole communicating with the accommodating groove, and
  wherein the at least one fixing member is disposed on the tube body and adjustably protruded out of an inner surface of the tube body.

\* \* \* \* \*